United States Patent [19]

Park

[11] 4,238,242

[45] Dec. 9, 1980

[54] LIGHTWEIGHT AGGREGATES, INTERMEDIATE AGGREGATES, AND PROCESS OF MANUFACTURING SAME

[76] Inventor: Jae H. Park, 5-171, Hyochang-Dong, Seoul, Rep. of Korea

[21] Appl. No.: 5,557

[22] Filed: Jan. 22, 1979

Related U.S. Application Data

[63] Continuation-in-part of Ser. No. 709,823, Jul. 29, 1976, abandoned.

[51] Int. Cl.³ .................... C04B 31/02; C04B 31/44
[52] U.S. Cl. ............................ 106/288 B; 106/308 B; 428/404; 428/407
[58] Field of Search ............ 106/40 R, 41, 97, 308 B, 106/288 B; 428/403, 404, 407

[56] References Cited

U.S. PATENT DOCUMENTS

| 2,553,759 | 5/1951 | Geiger | 106/288 B |
| 3,001,228 | 9/1961 | Nack | 428/403 |
| 3,444,104 | 5/1969 | Immel | 428/407 |

Primary Examiner—James Poer
Attorney, Agent, or Firm—Holman & Stern

[57] ABSTRACT

A lightweight intermediary aggregate for producing lightweight aggregate construction material is disclosed, in which expanded plastic beads are coated with an adhesive mixture comprising 50 to 100% viscous soil, 0 to 50% Portland cement, 0 to 6% sand, 0 to 10% calcium hydroxide, 0 to 4% sodium silicate together with an appropriate amount of water to form an intermediary layer. The lightweight intermediary aggregate is then fired to form the lightweight aggregate or cement mortar is additionally coated as an outer coating over the intermediary layer and cured.

12 Claims, 2 Drawing Figures

FIG.1
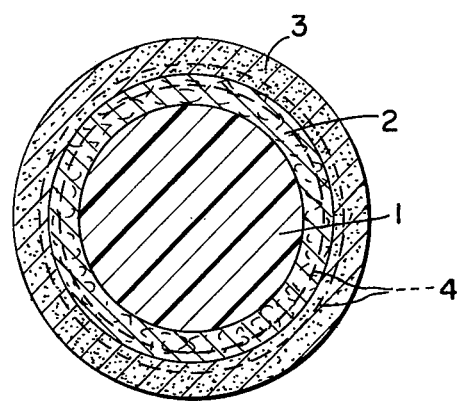
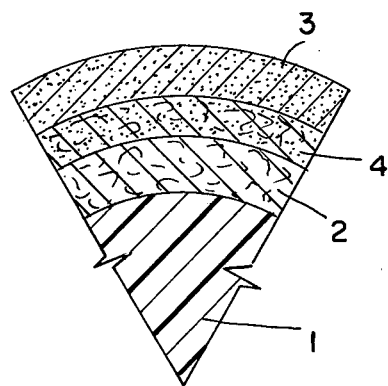
FIG. 2

LIGHTWEIGHT AGGREGATES, INTERMEDIATE AGGREGATES, AND PROCESS OF MANUFACTURING SAME

PRIOR APPLICATION

This application is a continuation-in-part of my copending application Ser. No. 709,823, filed July 29, 1976, now abandoned.

BACKGROUND OF THE INVENTION

This invention relates to lightweight aggregates, intermediary aggregates and processes for preparing them.

Since the introduction of cellular or expanded plastic (for example, expanded polystyrene), various researchers have attempted to make practical use of the lightweight and heat insulating properties of this type of plastic in aggregates. However, they have not been put into practical use up to the present time. The hitherto known solutions to this problem have proved to be uneconomical due to the high price of adhesives (for example, synthetic resin adhesives, natural pastes and the like) which have been suggested for adhering the mutually incompatible expanded plastic and cement mortar.

A further problem is the difficulty of mass production due to manufacturing difficulties. Even when the above-mentioned adhesives are used, the following defects remain:

First, the surface of expanded plastic is not easily wettable and therefore they cannot be effectively covered with the conventional adhesives to the required extent resulting in a poor adhesion, and the minute inorganic particles adherent to the adhesive-coated plastic are only thinly covered. The surface layer is therefore weak and can be damaged or broken by friction or impact on the aggregates during curing or transportation.

Secondly, a very long curing time is required for the above-mentioned aggregates because the adhesives have a tendency to surround the cement particles when the adhesive-coated expanded plastic is being covered with cement mortar, and this inhibits the removals of water and carbon dioxide from the cement during curing.

Thirdly, when the adhesive is dry, the outer layer of cement mortar contracts resulting in serious distortion. These changes reduce the strength of the cement.

Though there has been an effort to mix expanded plastic and cement mortar without using the above-mentioned pastes as adhesive, this has proved impossible except in special cases, because the strength of the matrix is weakened by minute vibrations of the matrix during curing.

The above-mentioned deficiencies have come to light as a result of manufacturing experiments.

In order to avoid these difficulties, it has been found in tests that the use of viscous soils suspended in water as pastes in the formation of an adhesive layer between expanded plastic cores and the cement mortar outer layer is beneficial.

DISCUSSION OF PRIOR ART

U.S. Pat. No. 3,444,104 (to Immel et al.) teaches the coating of expandable thermoplastic material, particularly expandable polystyrene beads with a clay derivative as an antisticking agent for the prevention of lumping during pre-expansion, because the beads have a tendency to stick together and form lumps, which lumps render the beads unsuitable for molding.

U.S. Pat. No. 3,001,228 (to Nack) teaches the use of dry clay powder as a coating material in pelletizing fusible material, for example, rosin in a gas-fluidized bed. The primary purposes of using clay as a coating material are to prevent agglomeration of droplets of fusible materials which tends to agglomerate when they are in their molten state and to facilitate a suitable condition for fluidization. Here, clay is used as an anti-sticking agent.

Neither these U.S. patents nor the prior art disclose or suggest the use of a viscous soil, for example, a clay paste, as an adhesive for the mutually incompatible expanded plastic beads and cement mortar.

BRIEF DESCRIPTION OF INVENTION

Thus, one aspect of the invention provides lightweight aggregate intermediates comprising expanded plastic cores having adherent thereto an adhesive liquid mixture comprising 50 to 100% preferably 60 to 99% viscous soil, 0 to 50% preferably 0 to 20% cement, 0 to 6% sand, 0 to 10% calcium hydroxide and 0 to 4% sodium silicate together with an appropriate quantity of water, all percents being by weight.

Preferred plastic cores useful in the present invention are expanded polystyrene beads.

Viscous (cohesive) soils having good adhesive properties useful in the present invention include clays (such as common clay, ball clay, brick clay, china clay, fire clay, bentonite, laterite, loess, loam, lacustrine clay, marine clay, and the like, and mixtures thereof).

The addition of calcium hydroxide, sand, cement and/or sodium silicate has been found to improve the hardness of the aggregrates. Kaolinite, montmorillonite and illite minerals having a microcrystalline character may also be used in the viscous soils in aggregates according to the present invention. These minerals have the cohesion that shows the state of equilibrium established by the electrostatic attraction or repulsion of the atoms in crystal lattices, as ionic bonding, covalent bonding, metallic bonding and Van der Waals forces. It is the characteristic of the present invention to make best use of the plasticity and adsorption peculiar to viscous soils caused by this cohesion.

The particle-attraction theory is an ancient concept, but it has been difficult to visualize how two particles with no charge could attract each other. The concept of the diffuse double layer, however, has indicated that an equilibrium distance is possible between particles; if they are closer than this distance, there will be repulsion, but if further apart, they are attracted. More recently it is believed that Van der Waals forces may be of importance in particle attraction. (F. H. Norton, Fine Ceramics Technology and Application, pages 140–141, published by McGraw-Hill (1970).)

The surface of any solid is more active than its interior, and therefore tends to attract not only ions but whole molecules. In general, the larger and more complex the molecule or ion, the more strongly it is adsorbed. (W. E. Worrals, Raw Materials, pages 34–35, published by Maclaren and Sons Ltd. (1964).)

Though it may be thought that coating expanded plastic directly with cement mortar alone is possible, cement mortar, as time elapses, has coagulation activity, but it has low viscosity. Accordingly, adhering cement mortar to the surface of plastic is difficult. Even if it adheres, it is easily damaged and broken away from the surface of the plastic during curing or conveying.

DESCRIPTION OF DRAWINGS

In the accompanying drawings,
FIG. 1 shows a cross-section of a particle of an aggregate according to the invention and
FIG. 2 shows the outer layers in more detail.

DETAILED DESCRIPTION OF THE PREFERRED EMBODIMENTS

The expanded polystyrene bead 1 is covered with a layer 2 of adhesive liquid mixture according to the invention, by use of conventional coating techniques. The outer layer 3, comprises burnable soil, when a lightweight aggregate is required, or cement mortar, when an aggregate having lightweight and heat-insulating properties is required. The outer layer 3 and the intermediate layer 2 may mix together at their boundary to form the diffuse layer 4.

The results of experiments to determine the adhering properties of soil pastes and cement pastes coated to the surface of cellular plastics are as follows.

EXPERIMENT 1

Cement pastes were prepared by admixing 30 g of cement and 18 g of water, and clay pastes prepared by admixing 30 g of common Korean clay and 18 g of water. Each of these pastes was coated to two separate groups of the spherical expanded polystyrene beads.

Cement may have viscous property towards the end of the coagulation procedure but its viscous property during the first hydrating procedure is not sufficient to permit adherance to the surface of the plastics, whereas viscous soils have sufficient viscous property to adhere to the surface of the plastics during the first hydrating procedure and have excellent surface adhering property. The secondary coating of cement mortar to the outer layer of the polystyrene beads coated by the clay pastes was accomplished without problem.

EXPERIMENT 2

To support the above experiment, viscosity tests of the cement pastes and the clay pastes of Experiment 1 (Flow Test of H. Wagner) and adhesion tests in water were performed and the results were as follows.

TABLE I

| Viscosity Test H. Wagner Flow Test at a slope of 45° of glass board. | | |
|---|---|---|
| | Samples | Length of flow |
| Cement pastes | (Cement) + (Water) 30g + 15 cc | 17 Cm |
| | (Cement) + (Water) 30g + 18 cc | 33 Cm |
| Clay Pastes | (Clay) + (Water) 30g + 15 cc | 1 Cm |
| | (Clay) + (Water) 30g + 18 cc | 15 Cm |

Adhesion Test in Water

Two kinds of spherical expanded polystyrene beads coated with cement pastes and clay pastes in Experiment (1) were floated in water and the degrees of separation of the coating were observed. Cement pastes adhered to the beads were disjoined when floated in water. Clay pastes adhered to the beads were not disjoined immediately when floated in water, but after about 10–20 minutes, they were slowly disjoined.

The above results of experiments show that, because clay pastes have strong viscosity and water-retaining property, their adhesion to the spherical cellular plastics is excellent.

The tests show that the defects caused by the use of any other adhesives like synthetic or natural adhesives in the manufacturing process of aggregates are completely removed. Furthermore, hardness and adhesive strength of the adhesive intermediary layer are excellent. The invention is also advantageous in allowing the production of aggregates at a low price owing to the use as adhesive of viscous soils easily obtainable, economic and plentiful throughout the world.

The following examples illustrate the present invention, but they are not intended to limit the scope of the invention. Parts and percents are by weight, unless specified otherwise.

EXAMPLE 1

Amounts of 60% clay, 30% Portland Cement, 4% sand, 4% calcium hydroxide and 2% of sodium silicate were mixed and to this mixture was added a suitable amount of water (about 60 volume percent of all contents) to form a paste. The paste was primarily coated on the surface of expanded polystyrene beads by the use of a screw mixer to form lightweight aggregate intermediates.

EXAMPLE 2

Amounts of 99% clay and 1% sodium silicate were mixed and to this mixture was added a suitable amount of water (about 60 volume percent of all contents) to form a paste. The paste was primarily coated on the surface of expanded polystyrene beads by means of a screw mixer to form lightweight aggregate intermediates.

EXAMPLE 3

Amounts of 80% clay, 10% Portland cement, 4% sand, 4% calcium hydroxide and 2% sodium silicate were mixed and to this mixture was added a suitable amount of water (about 60 volume percent of all contents) to form a paste. The paste was primarily coated on the surface of expanded polystyrene beads by means of a screw mixer to form lightweight aggregate intermediates.

Portland cement added to the pastes of the above examples prevents the weakening of the strength of the soil layer when the aggregate absorbs water, and calcium hydroxide also prevents the weakening of the strength of the clay layer by preventing excessive absorption of water. Sand and sodium silicate decrease the rate of shrinking during curing.

EXAMPLE 4

Lightweight aggregate intermediates of the foregoing examples were secondarily coated with cement mortar (cement: sand 1:1 to 1:6 by volume) in the following manner; the adhesive-coated beads were pushed on to one or more of vibrating pans where cement mortar was sprayed on the beads that were running down on the vibrating pans. The vibrating pans were placed on an downward angle to provide natural slope. The end of the vibrating pans was connected to a revolving large cylinder, which was placed substantially horizontally in such a way that the exit opening is slightly lower than the entering opening so as to facilitate rolling of the aggregates through the cylinder to the exit. The vibrating, rolling and turning motions make the adhesive coated beads separated and coated with cement mortar and compacted. The cement mortar-coated aggregates were then cured.

EXAMPLE 5

To 100% clay was added a suitable amount of water (about 60 volume percent of total mixture) and mixed to form a paste. The paste was primarily coated on the surface of expanded polystyrene by means of a screw mixer to form lightweight aggregate intermediates. Cement mortar then was secondarily coated on the lightweight aggregate intermediates in a manner similar to the procedure of Example 4.

EXAMPLE 6

Amounts of 96% clay, 2% sand and 2% sodium silicate were mixed and a suitable amount of water (about 60 volume percent of all contents) was added and mixed to form a paste. The paste was first coated on the surface of expanded polystyrene beads by means of a screw mixer. Burnable clay was then coated on the layer of the adhesive-coated beads in a manner similar to the procedure of Example 4. Then, after drying, the aggregates were burned to obtain lightweight aggregates.

EXAMPLE 7

To obtain viscous paste from soil having insufficient viscosity (e.g., free-flowing or particulate material), insufficiently viscous and fine inorganic materials, e.g., kaolin, fuller's earth, kieselguhr, calcium hydroxide, stone powder, coal ash and the like, were admixed with about 50% of soil having the required viscosity. Then, a suitable amount of water (about 70 volume percent of all contents) was added to the above mixture and stirred, or to the above mixture 20% cement and 4% sodium silicate were added and a suitable amount of water (about 70 volume percent of all contents) was added and mixed to obtain a paste. This paste was primarily coated on the surface of expanded polystyrene reads by means of a screw mixer to form lightweight aggregate intermediates, followed by a secondary coating with cement mortar in a manner similar to the procedure of Example 4 and then cured to produce the lightweight aggregates.

EXAMPLE 8

To manufacture a burned lightweight aggregate, 94% brick clay, 4% calcium hydroxide and 2% sodium silicate were mixed and to the mixture was added a suitable amount of water and mixed to obtain a paste. The paste was coated on the surface of expanded polystyrene beads, followed by a spray-coating with powder of brick clay giving a thickness of coating in 0.8mm-1.5mm. The coated beads were dried and burned at about 900°-1000° C. for 2 hours to obtain the aggregates.

EXAMPLE 9

Amounts of 98% brick clay and 2% sodium silicate were mixed and to this mixture was added a suitable amount of water (about 50 volume percent of total mixture) and mixed to obtain a paste. The paste was then coated on the surface of expanded polystyrene beads by means of a screw mixer, followed by a spray-coating with powder of brick clay giving a thickness of coating in 0.8 mm-1.5 mm. The coated beads were dried and burned at about 900°-1000° C. for 2 hours to obtain lightweight aggregates.

EXAMPLE 10

To 100% brick clay was added a suitable amount of water (about 60 volume percent of total mixture) and then mixed to obtain a paste. The paste was coated on the surface of expanded polystyrene beads by means of a screw mixer, followed by a spray-coating with powder of brick clay giving a thickness of coating in 0.8 mm-1.5 mm. The coated beads were dried and burned at about 900°-1000° C. for 2 hours to obtain the lightweight aggregates.

Additional clays useful for the production of burned lightweight aggregates of the present invention include common clay, ball clay, fire clay, bentonite, laterite, loess, loam, lacustrine clay, marine clay and mixtures thereof.

EXAMPLE 11

The clay-coated expanded polystyrene beads of any one of Examples 1 through 3, 5 and 7 were directly put into a conventional concrete mixer, where mixed with cement, sand and water to make plastic concrete.

Aggregates manufactured by the present invention are in a state that air is entrained in the interior of the aggregates and therefore, have flexible elasticity like a car-tire. These aggregates serve accordingly a role in the end products as hollow section iron bars and give excellent strength to the finished products.

Particularly, weight of the products manufactured by use of the aggregates of the present invention is decreased to the extent of 20-30% (weight) of total weight.

Construction and transportation costs of the products are lowered on account of their reduced weight. As products manufactured by using the aggregates of the present invention have lower absorption rate of moisture, they prevent the change of weight in a building or other structure to a great extent even when heavy rain falls. As the present aggregates and cement mortar are mixed uniformly, structure-strength and uneven weight distribution are prevented. Cracking in winter is prevented because surface condensation by a sudden temperature-change is prevented.

Destruction by contraction and expansion is prevented because of elasticity of aggregates. High effectiveness of the heat-insulating property saves both fuel in winter in cold regions and electricity for air-conditioner in summer, especially in tropical regions. Waterproofing agents, cement, sand, gravel and construction steel are saved by use of the aggregates of the present invention. As aggregates of the present invention have the effect of preventing vibration, soundproofing is not needed. Building or structure made by use of the present aggregates intercepts heat-flow between indoors and outdoors and has high damp-proof effect, being therefore good for health.

The properties of concrete bricks using lightweight aggregates of the present invention are shown in Table II below.

TABLE II

Experimenter: Korean National Construction Research Institute.

| Mix proportion(by wgt) Cement:Sand:LIKS* | W/C+ (%) | Slump (cm) | Dry Wgt. (kg/m³) | Comp. Strength(kg/m²) 7d | 28 d | Remarks |
|---|---|---|---|---|---|---|
| 1:1:1 | 45 | 5 | 1690 | 185 | 249 | Thermal Conductivity |
| 1:1.5:1.5 | 50 | 5 | 1640 | 164 | 212 | (Btu. in/ft. hr. F) |
| 1:2:2 | 50 | 5 | 1620 | 118 | 160 | |
| 1:2.5:2.5 | 50 | 5 | 1600 | 86 | 108 | Dense concrete: 10.0 |
| 1:3:3 | 50 | 5 | 1600 | 75 | 103 | Liks* concrete: 3.9 |
| 1:3.5:3.5 | 50 | 5 | 1580 | 58 | 85 | |
| 1:4:4 | 50 | 5 | 1420 | 50 | 70 | |
| 1:4.5:4.5 | 50 | 5 | 1360 | 38 | 55 | |

*Lightweight aggregates of the present invention
+Water/cement

The characteristic properties of the lightweight aggregates of the present invention are shown in Table III below.

TABLE III

Experimenter: Korean National Construction Research Institute.

| Items | | Standard Specification KSF 3524, ASTM C330 and JIS A 5002 | | Test Results |
|---|---|---|---|---|
| Dry specific gravity | — | | (JIS 1.0–1.5) | 1.22 |
| Water absorption | — | | | 1.25% |
| Soundness | Na₂SO₄ Saturated soln | max | (JIS 12%) | 4.51% |
| | Coarse aggregate | max | 880kg | 715kg |
| Unit weight | Uniformity of weight | max | 10% | 5% |
| | Organic impurities | | No darker than standard color | No darker |
| | Staining | max | 1.5mg Fe₂O₃ | 0.1mg Fe₂O₃ |
| Deleterious substances | Clay lumps | max | 2% | None |
| | Sulfur Trioxide (as SO₃) | max | (JIS 0.5%) | — |
| | Chlorides (as NaCl) | max | (JIS 0.01%) | — |
| | Suspended matter | max | (JASS 10%) | 8% |
| | Loss on ignition* | max | 5% | 6.5% |
| | Compressive strength | max | 210kg/kgcm² | 220kg/cm² |
| | Unit weight | max | 1760kg/cm³ | 1760kg/cm³ |
| Concrete-making properties | Drying shrinkage | max | 0.10% | 0.05% |
| | Popout | max | No surface popout | No popout |
| | Bond strength | | — | 60kg/cm² |
| | Durability | % | Rapid freezing and thawing 200 cycle | 93% |

*ASTM C331: Loss on ignition of cinder aggregate shall not exceed 35%
Korean Standard F (KSF)
Japanese Industrial Standard (JIS)

What is claimed is:

1. Lightweight aggregate for producing lightweight construction material, the aggregate consisting essentially of lightweight aggregate intermediates and an outer layer of cured cement mortar, the intermediates comprising expanded plastic cores having adhered thereto an adhesive mixture layer consisting essentially of 60 to 99% viscous soil by weight, 0 to 20% Portland cement by weight, 0 to 6% sand by weight, 0 to 10% calcium hydroxide by weight and 0 to 4% sodium silicate by weight together with an appropriate quantity of water, and the outer layer of cured cement mortar having a cement/sand ratio of 1:1 to 1:6 by volume, said aggregate having air entrained in the interior thereof, whereby the aggregate has flexible elasticity and heat-insulating properties.

2. Lightweight aggregate for producing lightweight aggregate construction material, the aggregate consisting essentially of lightweight aggregate intermediates and an outer layer of fired burnable soil, the intermediates comprising expanded plastic cores having adhered thereto an adhesive mixture layer consisting essentially of 60 to 99% viscous soil by weight, 0 to 20% Portland cement by weight, 0 to 6% sand by weight, 0 to 10% calcium hydroxide by weight and 0 to 4% sodium silicate by weight together with an appropriate quantity of water, said burnable soil being selected from the group consisting of burnable clay, brick clay, common clay, ball clay, fire clay, bentonite, laterite, loess, loam, lacustrine clay, marine clay and mixtures thereof, said aggregate having air entrained in the interior thereof, whereby the aggregate has flexible elasticity and heat-insulating properties.

3. Lightweight aggregate intermediates according to claim 2 wherein the plastic cores are substantially spherical.

4. Lightweight aggregate intermediates according to claim 2 wherein said expanded plastic cores are expanded polystyrene beads.

5. Lightweight aggregate intermediates according to claim 2 wherein the viscous soil is selected from the group consisting of common clay, ball clay, brick clay, china clay, fire clay, bentonite, laterite, loess, loam, lacustrine clay, marine clay, and mixtures thereof.

6. Lightweight aggregate according to claim 5 wherein the viscous soil comprises a viscous paste including a mixture of a soil having a low viscosity and an inorganic material.

7. Lightweight aggregate intermediates according to claim 5 wherein the inorganic materials are selected from the group consisting of kaolin, fuller's earth, kieselguhr, calcium hydroxide, stone power and coal ash.

8. Lightweight aggregates according to claim 1 wherein a diffused boundary exists between the adhesive mixture layer and the cement mortar layer.

9. A process for the manufacture of lightweight aggregates from lightweight aggregate intermediates which comprises the steps of forming the intermediates by applying onto the surface of expanded plastic cores an adhesive mixture layer consisting essentially ob 60 to 99% viscous soil, 0 to 20% Portland cement, 0 to 6% sand, 0 to 10% calcium and 0 to 4% sodium silicate together with an appropriate quantity of water, all percents being by weight, and coating said lightweight aggregate intermediates with cement mortar having a cement/sand ratio of 1:1 to 1:6 by volume, and then curing to form the lightweight aggregates.

10. A process for the manufacture of lightweight aggregate from lightweight aggregate intermediates which comprises the steps of forming the intermediates by applying onto the surface of expanded plastic cores an adhesive mixture layer consisting essentially of 60 to 99% viscous soil, 0 to 20% Portland cement, 0 to 6% sand, 0 to 10% calcium and 0 to 4% sodium silicate together with an appropriate quantity of water, all percents being by weight, and applying burnable soil to said lightweight aggregate intermediates to form a coating and burning the coated intermediates to volatilize the plastic core and fire the burnable soil coating.

11. The process as claimed in claim 10 wherein said burnable soil is selected from the group consisting of burnable clay, brick clay, common clay, ball clay, fire clay, bentonite, laterite, loess, loam, lacustrine clay, marine clay and mixtures thereof.

12. The process as claimed in claim 10, wherein said coated intermediates are burned at 900°–1000° C. for about two hours to volatilize the plastic core and fire the burnable soil coating.

* * * * *